US011285541B2

(12) United States Patent
Matsumoto

(10) Patent No.: US 11,285,541 B2
(45) Date of Patent: Mar. 29, 2022

(54) METHOD FOR PRODUCING THREE-DIMENSIONAL MOLDED OBJECT

(71) Applicant: Sodick Co., Ltd., Kanagawa (JP)

(72) Inventor: Itaru Matsumoto, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 361 days.

(21) Appl. No.: 16/289,838

(22) Filed: Mar. 1, 2019

(65) Prior Publication Data

US 2019/0308242 A1 Oct. 10, 2019

(30) Foreign Application Priority Data

Apr. 6, 2018 (JP) .............................. JP2018-074120

(51) Int. Cl.
| | |
|---|---|
| *B33Y 40/00* | (2020.01) |
| *B33Y 10/00* | (2015.01) |
| *B22F 10/66* | (2021.01) |
| *B22F 10/10* | (2021.01) |
| *B22F 12/00* | (2021.01) |
| *B22F 10/77* | (2021.01) |

(52) U.S. Cl.
CPC .............. *B22F 12/00* (2021.01); *B22F 10/66* (2021.01); *B33Y 10/00* (2014.12); *B33Y 40/00* (2014.12); *B22F 10/10* (2021.01); *B22F 10/77* (2021.01)

(58) Field of Classification Search
CPC ..... B22F 10/00; B22F 10/66; B22F 2003/247
See application file for complete search history.

(56) References Cited

U.S. PATENT DOCUMENTS

| 2010/0034983 A1 | 2/2010 | Fuwa et al. |
|---|---|---|
| 2012/0308781 A1 | 12/2012 | Abe et al. |
| 2017/0282462 A1 | 10/2017 | Abe et al. |

(Continued)

FOREIGN PATENT DOCUMENTS

| CN | 102762323 A | 10/2012 |
|---|---|---|
| CN | 107073819 A | 8/2017 |

(Continued)

OTHER PUBLICATIONS

Office Action dated Aug. 20, 2019, in corresponding Japanese Application No. 2018-074120; 4 pages.

(Continued)

*Primary Examiner* — Anthony J Zimmer
*Assistant Examiner* — Sean P. O'Keefe
(74) *Attorney, Agent, or Firm* — Maier & Maier, PLLC

(57) ABSTRACT

The method for producing a three-dimensional molded object comprises a placing step, a molding step, and an upper surface processing step. The placing step is a step of placing a base plate and a mounting plate within a molding region. A first material powder layer is formed on the base plate; and the base plate is fixed to the mounting plate at a central part of the base plate to an extent that the base plate is not displaced. The molding step is a step of laminating sintered layers to form a sintered body. The sintered layers are laminated by repeatedly spreading material powder to form a material powder layer and irradiating the material powder layer with a beam to form the sintered layer. The upper surface processing step is a step of planarizing an upper surface of the sintered body to form a processed surface.

4 Claims, 19 Drawing Sheets

(56) References Cited

U.S. PATENT DOCUMENTS

2018/0169757 A1\* 6/2018 Murao .................. B33Y 50/02
2019/0091923 A1 3/2019 Abe et al.

FOREIGN PATENT DOCUMENTS

| DE | 102009036648 A1 | 2/2010 |
| JP | 2012-224906 A | 11/2012 |
| JP | 5535121 B2 | 7/2014 |
| JP | 5611433 B1 | 10/2014 |
| JP | 2017-160485 A | 9/2017 |

OTHER PUBLICATIONS

Chinese Office Action dated Mar. 2, 2021, in connection with corresponding CN Application No. 201910261677.3 (15 pp., including machine-generated English translation).

German Office Action dated Nov. 6, 2020, in connection with corresponding DE Application No. 10 2019 107 494.0 (9 pp., including machine-generated English translation).

\* cited by examiner

METHOD FOR PRODUCING THREE-DIMENSIONAL MOLDED OBJECT

CROSS-REFERENCE TO RELATED APPLICATION

This application claims priority to Japanese Patent Application, No. 2018-074120 filed on Apr. 6, 2018, the entire contents of which are incorporated by reference herein.

FIELD

The present invention relates to a method for producing a three-dimensional molded object.

BACKGROUND

In powder bed fusion, a base plate is placed on a molding table capable of vertical movement in a chamber filled with inert gas, and very thin sintered layers made of metal are then laminated on the base plate. For example, in selective laser sintering, which is one type of the powder bed fusion, metal material powder is spread flatly to form a material powder layer. Subsequently, a predetermined portion of the material powder layer is irradiated with a laser beam to heat and melt or sinter the material powder at an irradiated position, and the melted material powder is then cooled and solidified to form a sintered layer. By repeating these procedures, a plurality of sintered layers is laminated to form a desired molded object having a three-dimensional shape. In this regard, an electron beam may be used instead of the laser beam. Hereinafter, light having energy capable of melting or sintering the material powder is simply referred to as a beam, and this includes at least a laser beam and an electron beam. Moreover, sintering and melting are not distinguished but simply referred to as sintering below.

It is known that the sintered layers gradually contract over time when the material powder heated and melted by irradiation with the beam is cooled and solidified. Consequently, as described, for example, in Patent Literature 1, end edge sides of the base plate and lower sintered layers which are fixed to the base plate and have already contracted are pulled upward and deformed when upper sintered layers immediately after sintering contract.

CITATION LIST

Patent Literature

Patent Literature 1: JP5535121B

SUMMARY

Technical Problem

The present invention has been made in consideration of the afore-mentioned circumstances. An object of the present invention is to prevent breakage of a three-dimensional molded object to be formed and deterioration of shape accuracy due to the deformation of the base plate during or after sintering the material powder by irradiation with a beam.

Solution to Problem

According to the present invention, provided is a method for producing a three-dimensional molded object, comprising: a placing step of placing a base plate and a mounting plate within a molding region, wherein: a first material powder layer is formed on the base plate; and the base plate is fixed to the mounting plate at a central part of the base plate to an extent that the base plate is not displaced; a molding step of laminating sintered layers to form a sintered body, wherein the sintered layers are laminated by repeatedly spreading material powder to form a material powder layer and irradiating the material powder layer with a beam to form a sintered layer; and an upper surface processing step of planarizing an upper surface of the sintered body to form a processed surface.

Advantageous Effects of Invention

In the present invention, the base plate is allowed to deform when the sintered layer is formed. Therefore, after the deformation of the sintered body and the base plate is terminated, residual stress between the sintered body and the base plate is in a balanced state, and thus further substantial deformation does not occur. Furthermore, even if the upper surface of the sintered body is planarized after the deformation of the sintered body and the base plate is terminated, the residual stress between the sintered body and the base plate is maintained balanced thereafter, and further substantial deformation does not occur. Consequently, the breakage of the three-dimensional molded object and the deterioration of shape accuracy can be prevented.

DETAILED DESCRIPTION

Figure 1:
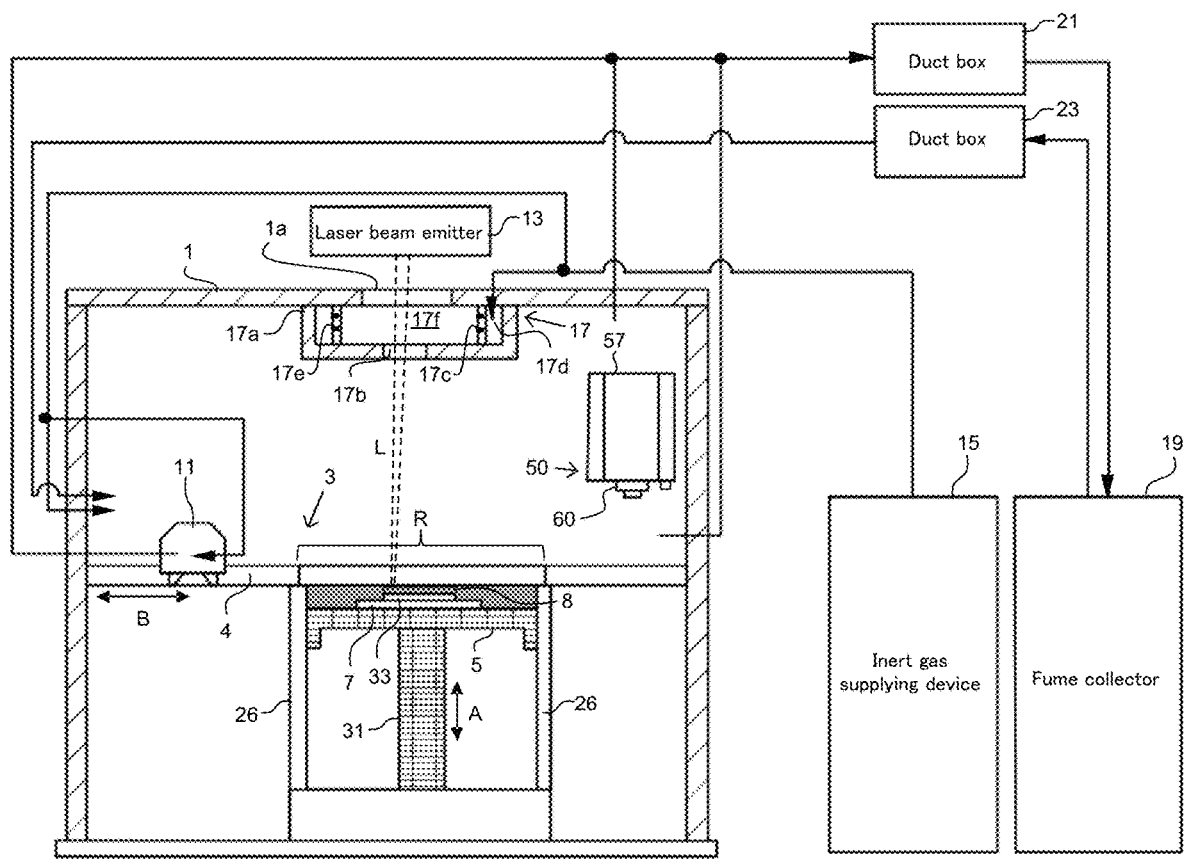
FIG. 1 is a schematic configuration view of a lamination molding apparatus according to an embodiment of the present invention.

Hereinafter, the embodiments of the present invention will be described with reference to the drawings. The characteristic matters shown in the embodiments described below can be combined with each other. It is noted that each component is represented schematically in each drawing. In particular, shapes of a deformed base plate 33 and a deformed sintered body 81 are represented exaggeratingly in the drawings for ease of understanding of the invention. A surface of the base plate 33 on which a plurality of sintered layers are laminated to form the sintered body 81 is referred to as an upper surface of the base plate 33. A surface of the base plate 33 opposed to the upper surface is referred to as a rear surface 39 of the base plate 33. A surface of the sintered body 81 which contains the sintered layer formed last is referred to as an upper surface 82 of the sintered body 81.

Lamination Molding Apparatus

As shown in FIG. 1, a lamination molding apparatus according to an embodiment of the present invention comprises a chamber 1, a laser beam emitter 13, and a cutting device 50.

The chamber 1 covers a required molding region R. Clean inert gas is supplied to the chamber 1 by a gas supplying device 15. Inert gas containing fumes generated during formation of the sintered layer is discharged from the chamber 1. In this way, an inside of the chamber 1 is filled with the inert gas of a predetermined concentration to prevent deterioration of a material powder layer 8 and the sintered layer. Preferably, the inert gas discharged from the chamber 1 is reused after removing the fumes. The inert gas discharged from the chamber 1 is sent to a fume collector 19 through a duct box 21. The fumes are removed from the inert gas sent to the fume collector 19, and the inert gas is then returned into the chamber 1 through a duct box 23. In this regard, the inert gas is gas that does not react substantially with material powder, and examples of the inert gas are nitrogen gas, argon gas, and helium gas.

A powder layer forming device 3 is provided inside the chamber 1. The powder layer forming device 3 has a base table 4 and a recoater head 11. The base table 4 has the molding region R where a three-dimensional molded object is formed. The molding region R is formed on a molding table 5. The molding table 5 can be driven by a molding table driving mechanism 31 and move in a vertical direction (the direction of the arrow A in FIG. 1). At the time of molding, a mounting plate 7 and the base plate 33 are arranged on the molding table 5, and the material powder layer 8 is formed on the base plate 33. Furthermore, a predetermined irradiated region exists within the molding region R and roughly matches a region surrounded by a contour shape of the desired sintered body 81. Powder retaining walls 26 are provided around the molding table 5. Unsintered material powder is retained in a powder retaining space surrounded by the powder retaining walls 26 and the molding table 5.

Figure 2:
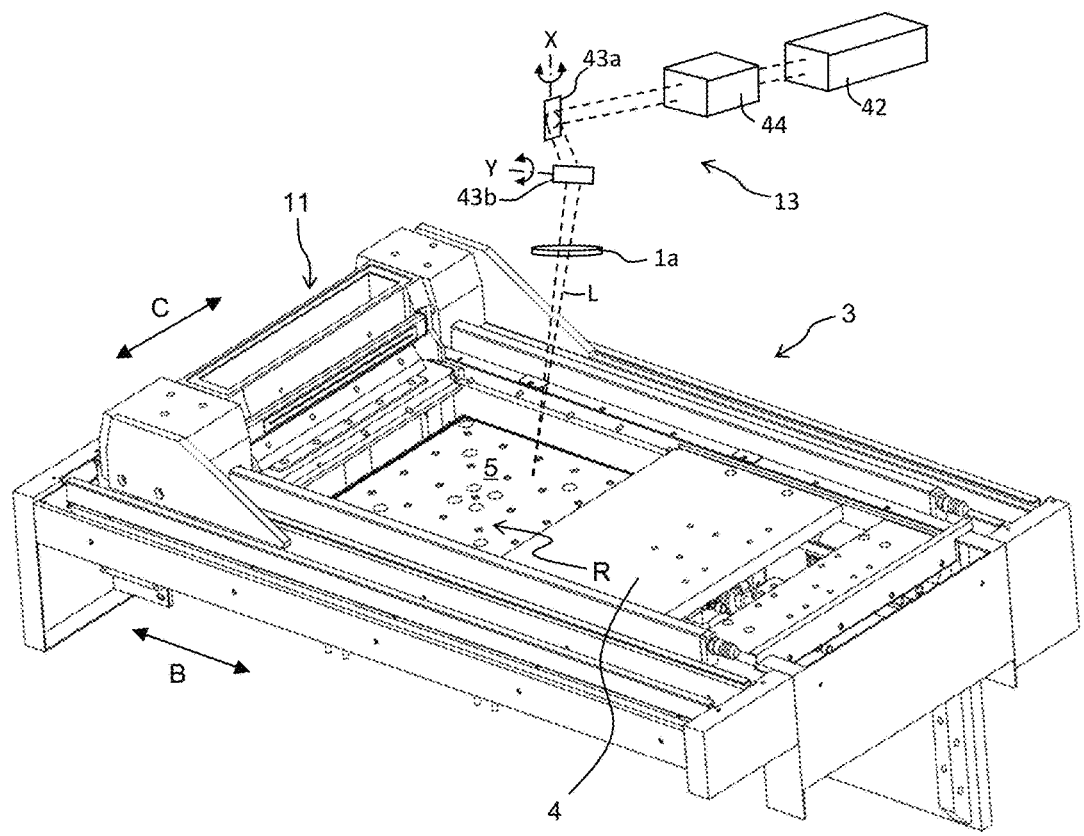
FIG. 2 is a perspective view of a powder layer forming device and a laser beam emitter according to the embodiment of the present invention.
Figure 3:
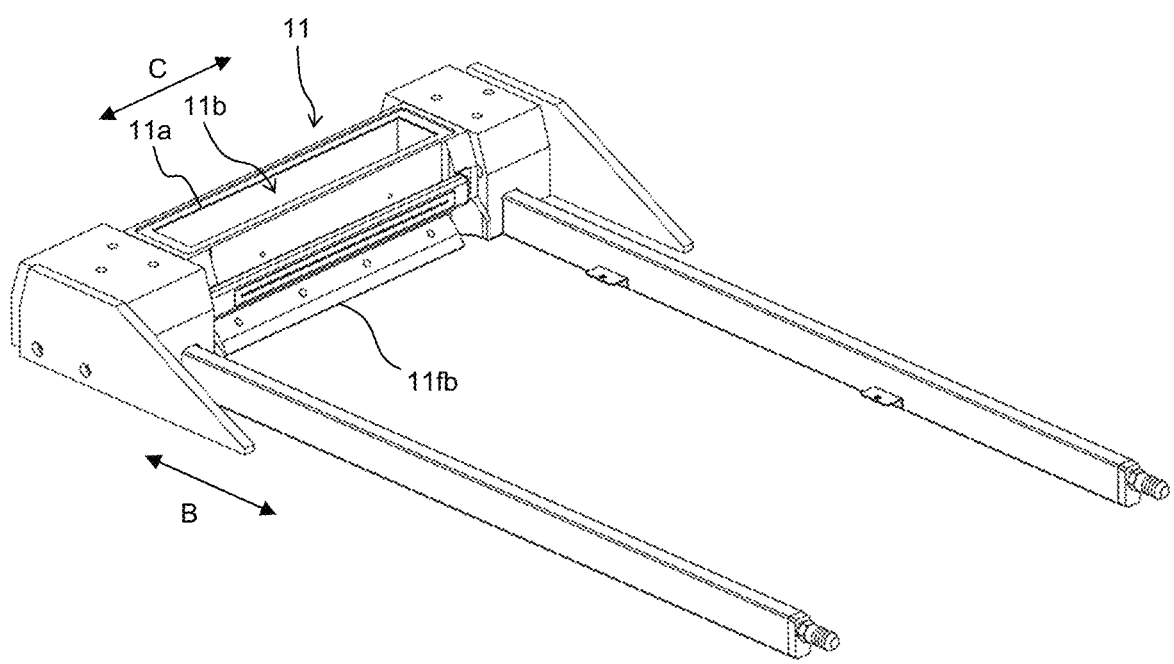
FIG. 3 is a perspective view of a recoater head according to the embodiment of the present invention.
Figure 4:
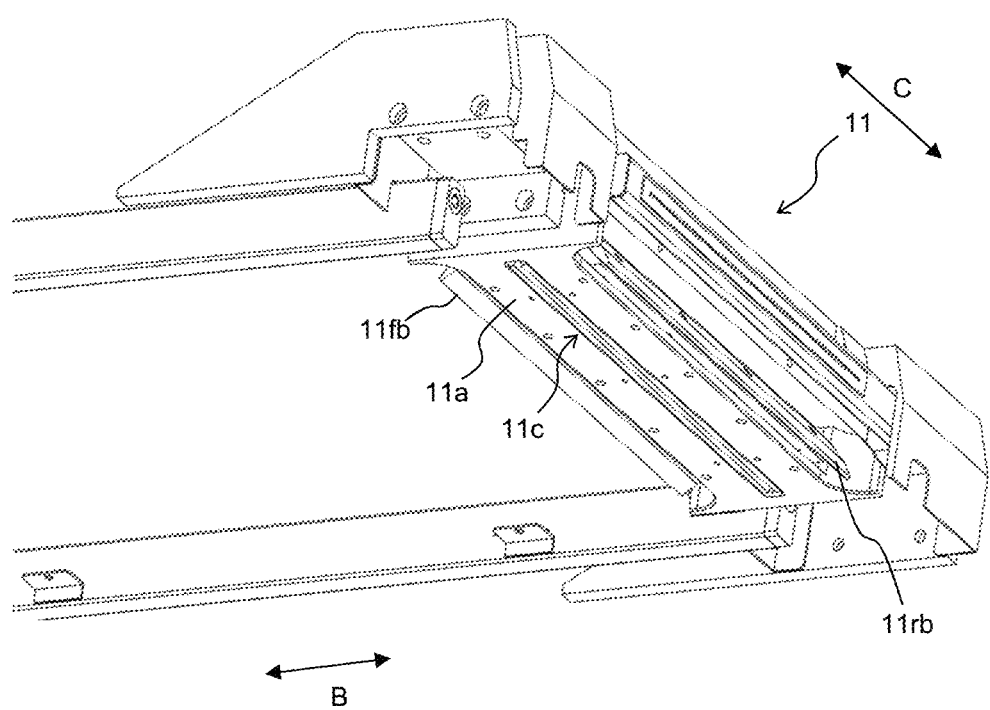
FIG. 4 is a perspective view of the recoater head according to the embodiment of the present invention from another angle.

As shown in FIG. 2 to FIG. 4, the recoater head 11 has a material holding section 11a, a material supplying section 11b, and a material discharging section 11c. The material powder is accommodated in the material holding section 11a. In this regard, the material powder is, for example, a metal material powder, and is, for example, of a spherical shape having an average particle diameter of 20 µm. The material supplying section 11b is provided on an upper surface of the material holding section 11a and serves as an opening receiving material powder which is supplied from a material supplying device (not shown) to the material holding section 11a. The material discharging section 11c is provided on a bottom surface of the material holding section 11a and discharges the material powder accommodated in the material holding section 11a. In this regard, the material discharging section 11c has a slit shape extending in a horizontal one-axis direction (the direction of the arrow C), which is orthogonal to the moving direction (the direction of the arrow B) of the recoater head 11. Furthermore, a blade 11fb is provided on one side of the recoater head 11, while a blade 11rb is provided on the other side. The blades 11fb and 11rb planarize the material powder discharged from the material discharging section 11c to form the material powder layer 8.

As shown in FIG. 1, the cutting device 50 has a processing head 57 provided with a spindle 60. The processing head 57 is moved in a vertical one-axis direction and a horizontal two-axis direction by a processing head driving mechanism (not shown) and thus moves the spindle 60 to a desired position. The spindle 60 is configured so that a cutting tool, such as an end mill (not shown), can be attached on the spindle 60 and rotated. The spindle 60 can perform cutting of a surface or unnecessary portion of the sintered layer obtained by sintering the material powder. In the present embodiment, the cutting device 50 planarizes the upper surface 82 of the sintered body 81. The cutting tool is preferably plural types of cutting tools, and the cutting tools to be used can be exchanged also during molding by an automatic tool changing device (not shown).

In this regard, the cutting device may be of another form. For example, the cutting device has a turning mechanism with a cutting tool, such as a tool bit, and a processing head provided with the turning mechanism. With such a cutting device, the upper surface 82 of the sintered body 81 can be shaped to planarize the upper surface 82. As will be described later, when planarizing the upper surface 82 of the sintered body 81, grinding may be performed instead of cutting. If grinding is performed in the lamination molding apparatus, a grinding device having a grindstone and a spindle for rotating the grindstone may be provided in the lamination molding apparatus.

A window 1a and a fume diffusion apparatus 17 are provided on an upper surface of the chamber 1. The window 1a is formed of a material capable of transmitting a laser beam L. For example, if the laser beam L is a fiber laser or a YAG laser, the window 1a can be made of quartz glass. The fume diffusion apparatus 17 is provided so as to cover the window 1a. The fume diffusion apparatus 17 comprises a cylindrical housing 17a and a cylindrical diffusion member 17c arranged in the housing 17a. An inert gas supplying space 17d is provided between the housing 17a and the diffusion member 17c. Furthermore, an opening 17b is provided inside the diffusion member 17c, on a bottom surface of the housing 17a. The diffusion member 17c is provided with a large number of pores 17e, and the clean inert gas supplied to the inert gas supplying space 17d is filled into a clean room 17f through the pores 17e. The clean inert gas filled in the clean room 17f is then ejected downward of the fume diffusion apparatus 17 through the opening 17b.

As shown in FIG. 2, the laser beam emitter 13 is provided above the chamber 1. The laser beam emitter 13 irradiates a predetermined portion of the material powder layer 8 formed on the molding region R with the laser beam L to sinter the material powder at an irradiated position. Specifically, the laser beam emitter 13 has a laser source 42, a focus control unit 44, and a two-axis galvanometer scanner. The galvanometer scanner has a pair of galvanometer mirrors 43a and 43b and a pair of actuators for rotating each of the galvanometer mirrors 43a and 43b.

The laser source 42 emits the laser beam L. Here, the laser beam L is a laser capable of sintering the material powder, and for example, a $CO_2$ laser, a fiber laser, and a YAG laser can be used. The focus control unit 44 focuses the laser beam L output from the laser source 42 to adjust it to a desired spot diameter. The two-axis galvanometer scanner scans two-dimensionally the laser beam L output from the laser source 42. A control device (not shown) outputs a control signal to the actuators and controls rotating angles of the galvanometer mirrors 43a and 43b to irradiate a desired position with the laser beam L. The laser beam L which has passed through the galvanometer mirrors 43a and 43b transmits the window 1a, and then the material powder layer 8 formed in the molding region R is irradiated with the laser beam L.

While the laser beam L is used as a beam for sintering the material powder in the lamination molding apparatus of the present embodiment, for example, an electron beam may be used. In that case, instead of the laser beam emitter 13, an electron beam emitter which scans the electron beam at a desired position of the material powder layer 8 is provided.

Method for Producing the Three-Dimensional Molded Object

A method for producing the three-dimensional molded object using the afore-mentioned lamination molding apparatus will be described with reference to FIG. 5 to FIG. 16. It is noted that some of the components of the lamination molding apparatus shown in FIG. 1 are omitted in FIG. 9 to FIG. 11 in consideration of visibility.

First, a placing step of placing the base plate 33 and the mounting plate 7 within the molding region R is performed. More specifically, the base plate 33 and the mounting plate 7 are fixed on the molding table 5.

Figure 5:
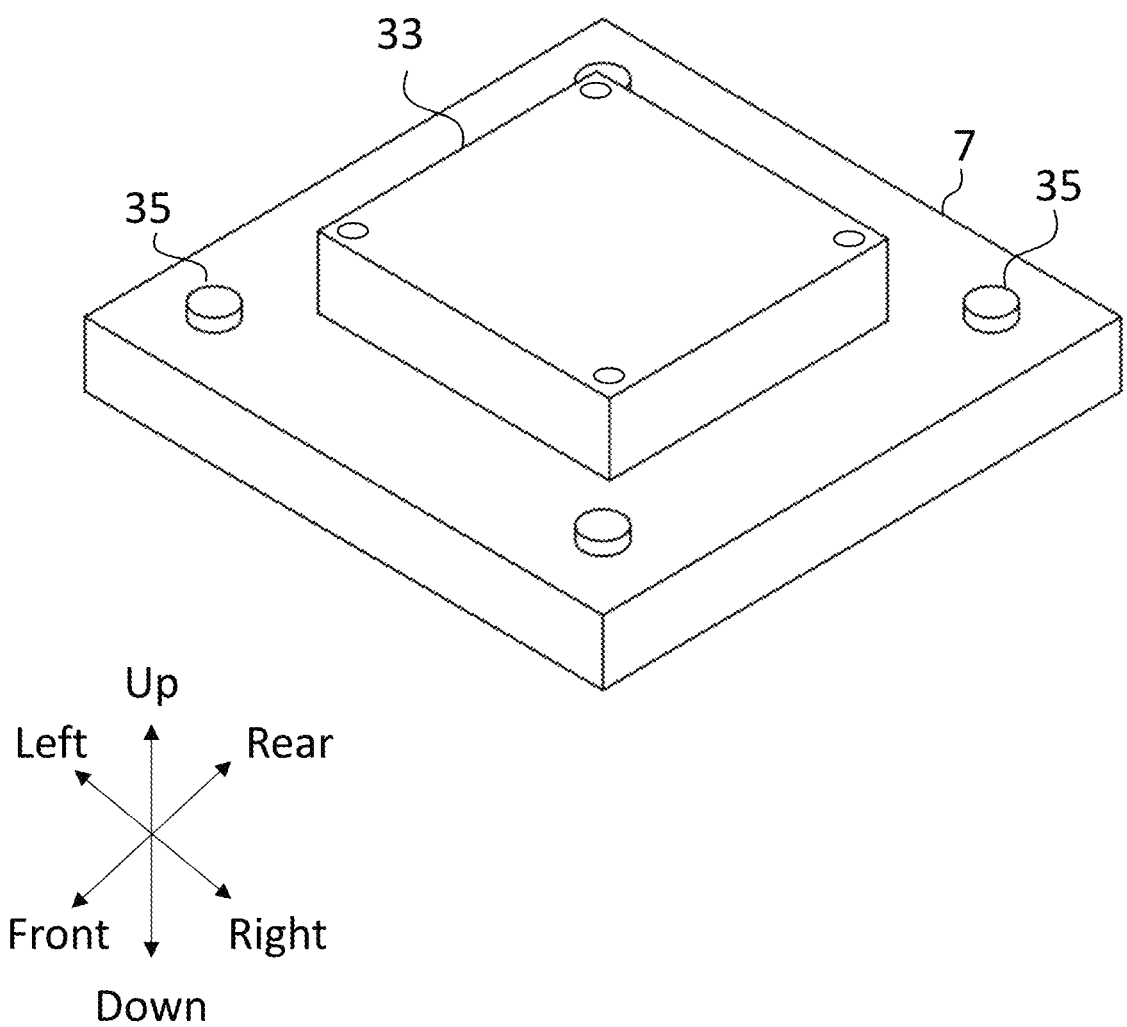
FIG. 5 is a perspective view showing a mounting plate and a base plate.
Figure 6:
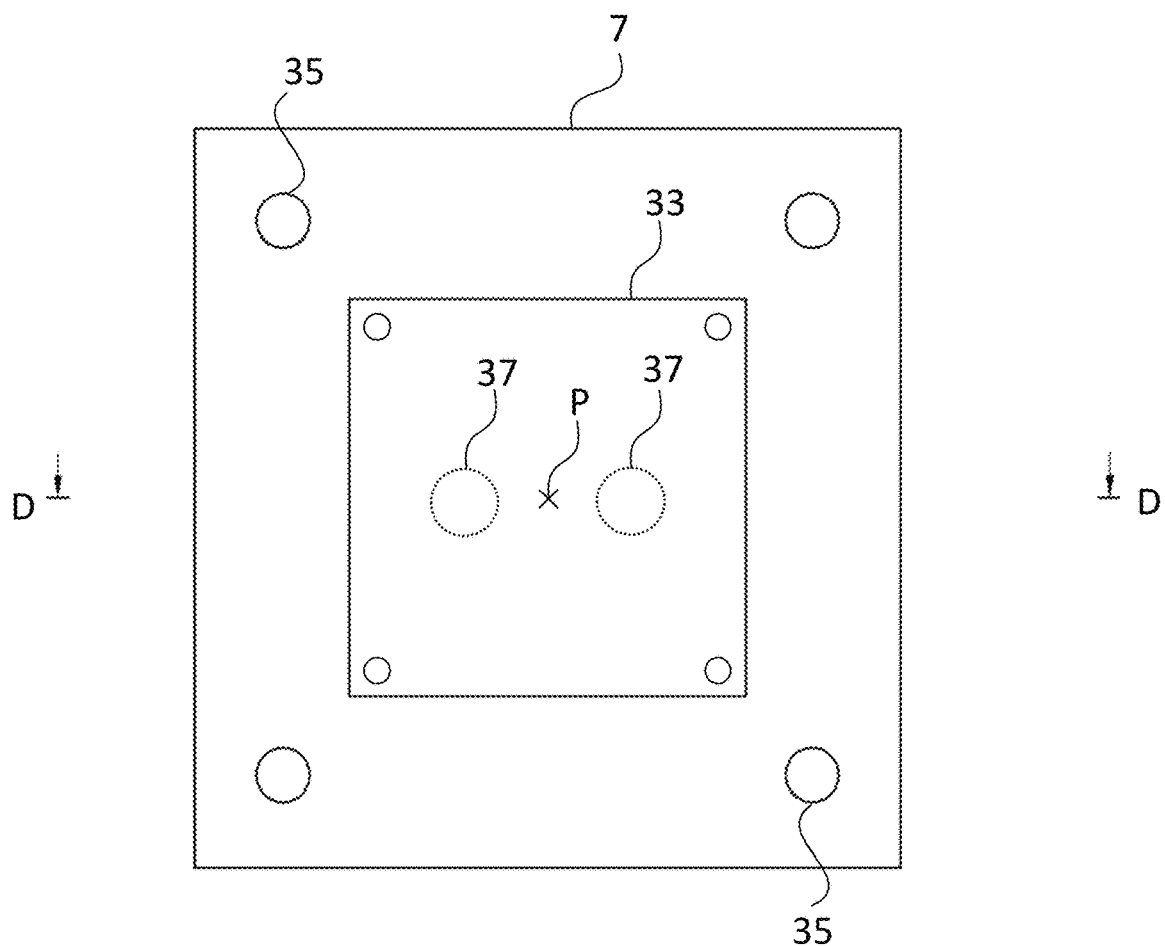
FIG. 6 is a plan view showing the mounting plate and the base plate.
Figure 6:
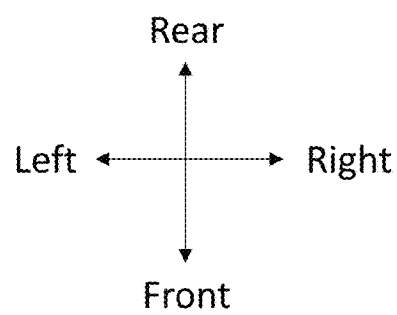
Figure 7:
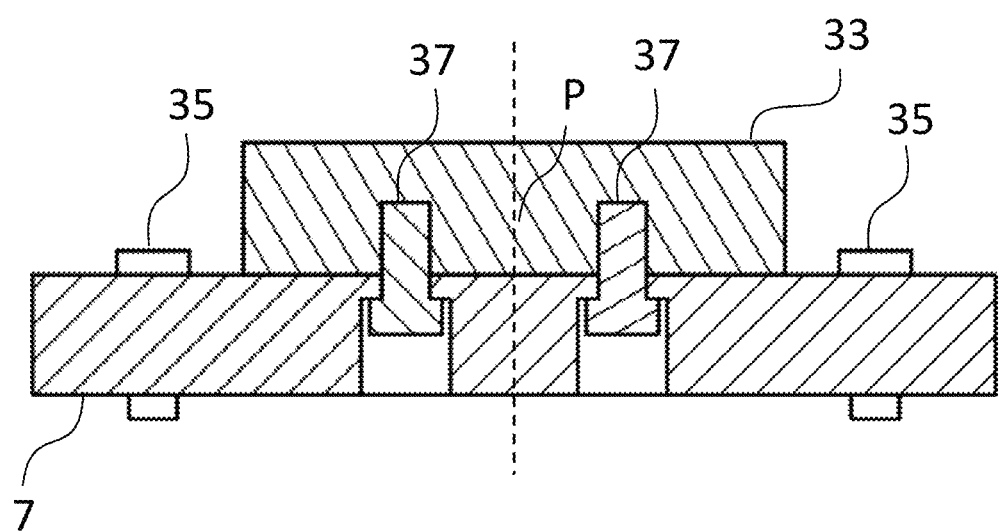
FIG. 7 is a cross-sectional view at the D-D cross section in FIG. 6.

FIG. 5 is a perspective view showing the mounting plate 7 and the base plate 33. FIG. 6 is a plan view showing the mounting plate 7 and the base plate 33. FIG. 7 is a cross-sectional view at the D-D cross section in FIG. 6. For the following description, the front-rear direction, the left-right direction, and the up-down direction are defined, as shown in FIG. 5 or FIG. 6. The mounting plate 7 and the base plate 33 comprise a rectangular plane in the present embodiment, but not limited thereto. Furthermore, the mounting plate 7 and the base plate 33 are made of, for example, metal, such as iron or steel. The mounting plate 7 and the base plate 33 may be made of a same material or different materials.

As shown in FIG. 5 to FIG. 7, the base plate 33 is removably fixed to the mounting plate 7. In the method for producing the three-dimensional molded object of the present invention, the base plate 33 is basically allowed to deform during molding so as to prevent substantial deformation after molding due to residual stress. Generally, end edges of the base plate 33 deform so as to warp upward due to tensile residual stress. Therefore, it is preferable, from the viewpoint of balancing the residual stress between the sintered body 81 and the base plate 33, to fix the base plate 33 to the mounting plate 7 at one point in a center of the base plate 33. In this regard, it is necessary to fix the base plate 33 so as not to be displaced since a strong force generated at the time of the deformation acts intensively at the fixing point, or the base plate 33 may be displaced as a result of receiving an external force, such as during cutting. Therefore, the base plate 33 is fixed to the mounting plate 7 at one or more fixing points as few as possible at a position as close as possible to the center of the base plate 33 to an extent that the base plate 33 is not displaced. In other words, the base plate 33 is fixed to the mounting plate 7 at a central part of the base plate 33 to an extent that the base plate 33 is not displaced. In the present embodiment, the base plate 33 is fixed to the mounting plate 7 from underneath with two fixing bolts 37 in order to prevent the base plate 33 from being displaced. In this regard, a fixing means for fixing the base plate 33 to the mounting plate 7 is not limited to the fixing bolts 37, and any means which can fix the base plate 33 to the mounting plate 7 with a sufficient force at a fixing position close to the center of the base plate 33 can be used.

Figure 8:
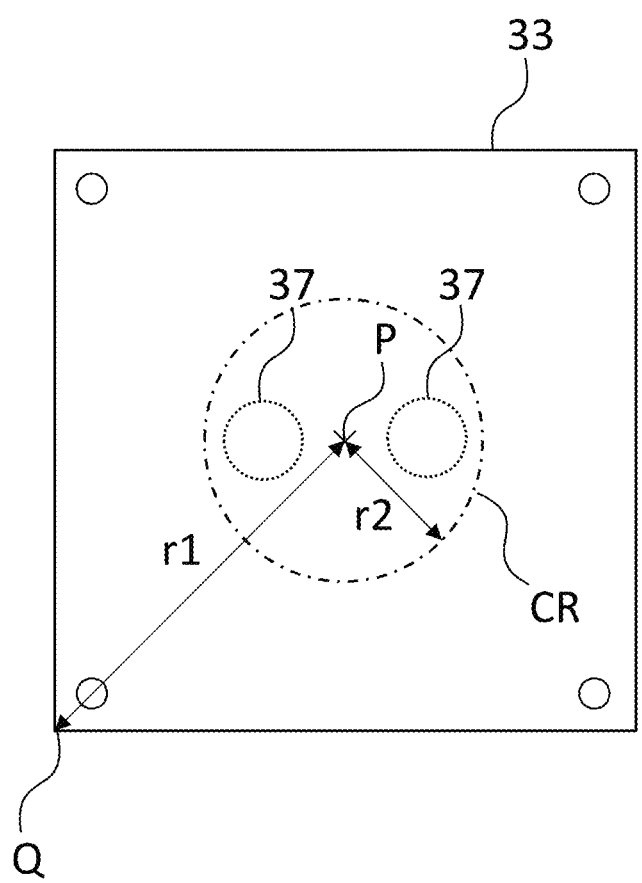
FIG. 8. is a drawing showing a positional relation of fixing points between the base plate and the mounting plate.

FIG. 8 is a plan view showing a positional relation of the fixing points between the base plate 33 and the mounting plate 7. The position and number of the fixing points differ according to material, shape, and size of the base plate 33 and the sintered body 81. In FIG. 8, the material of the sintered body 81 is maraging steel. The material of the base plate 33 is carbon steel for machine structural use (e.g. S50C prescribed by Japanese Industrial Standard), and the size of the base plate 33 is 230 mm×180 mm×50 mm A length from the center of gravity P to an end Q in the plan view of the base plate 33 is shown as r1. Here, the end Q refers to a point of the base plate 33 farthest from the center of gravity P in plan view. Furthermore, a circle that surrounds any of the one or more fixing points around the center of gravity P of the base plate 33 is defined as CR, and a radius of the circle CR is shown as r2. Here, the position of the fixing points is determined so that $r2/r1 \leq 0.70$. Namely, the central part of the base plate 33 may be an area corresponding with the circle CR when $r2/r1 \leq 0.70$.

The mounting plate 7 to which the base plate 33 is fixed is placed on the molding table 5 having the molding region R. Four corners of the mounting plate 7 are fixed to the molding table 5 with, for example, four fixing bolts 35. When fixing the mounting plate 7 to the molding table 5, the position and number of the fixing points are not limited. Furthermore, the mounting plate 7 may be fixed by another means other than the fixing bolts 35, for example, by means of a clamp.

Subsequently, a molding step of laminating the sintered layers to form the sintered body 81 is performed, wherein the sintered layers are laminated by repeatedly spreading the material powder to form the material powder layer 8 and irradiating the material powder layer 8 with the laser beam L to form the sintered layer.

Figure 9:
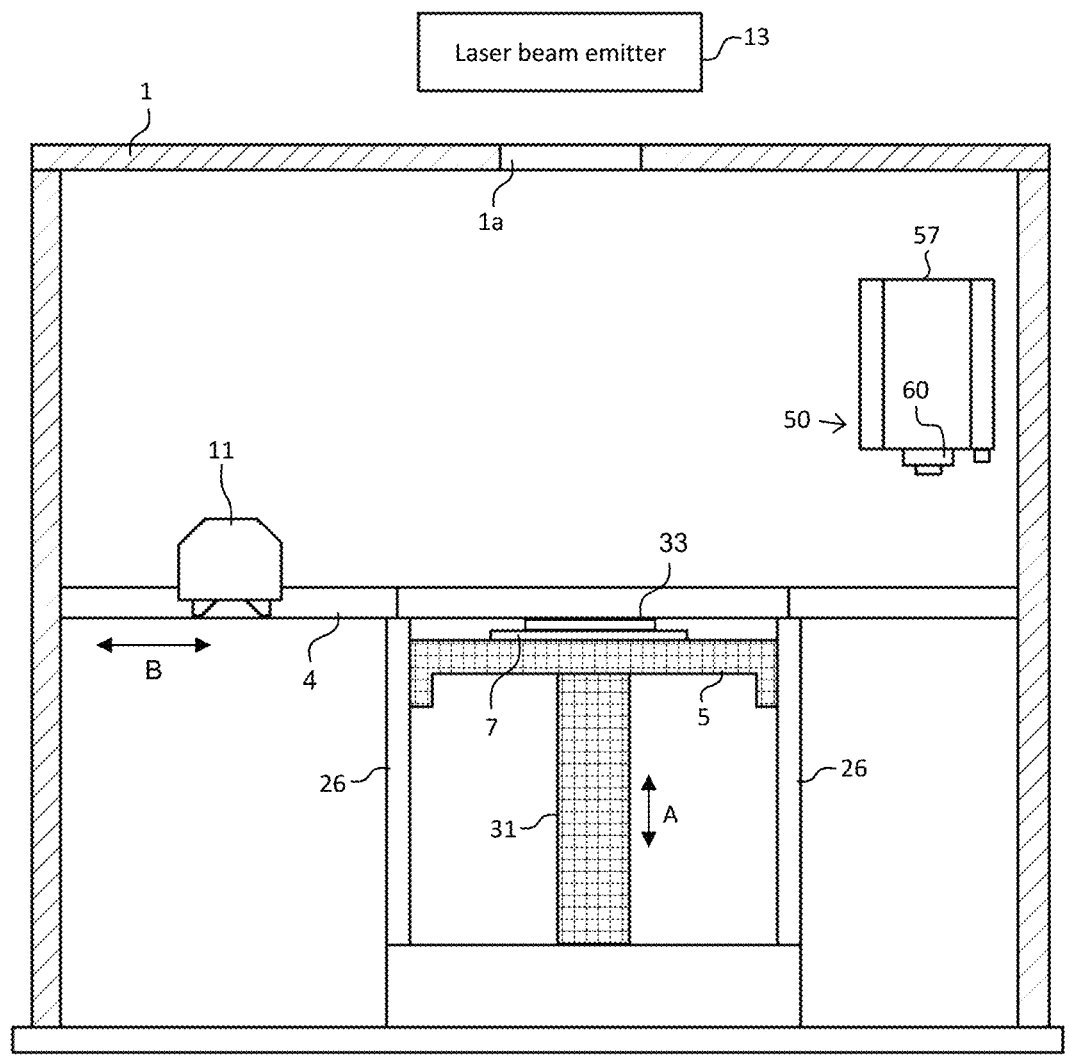
FIG. 9 is a drawing of a lamination molding method using the lamination molding apparatus according to the embodiment of the present invention.
Figure 10:
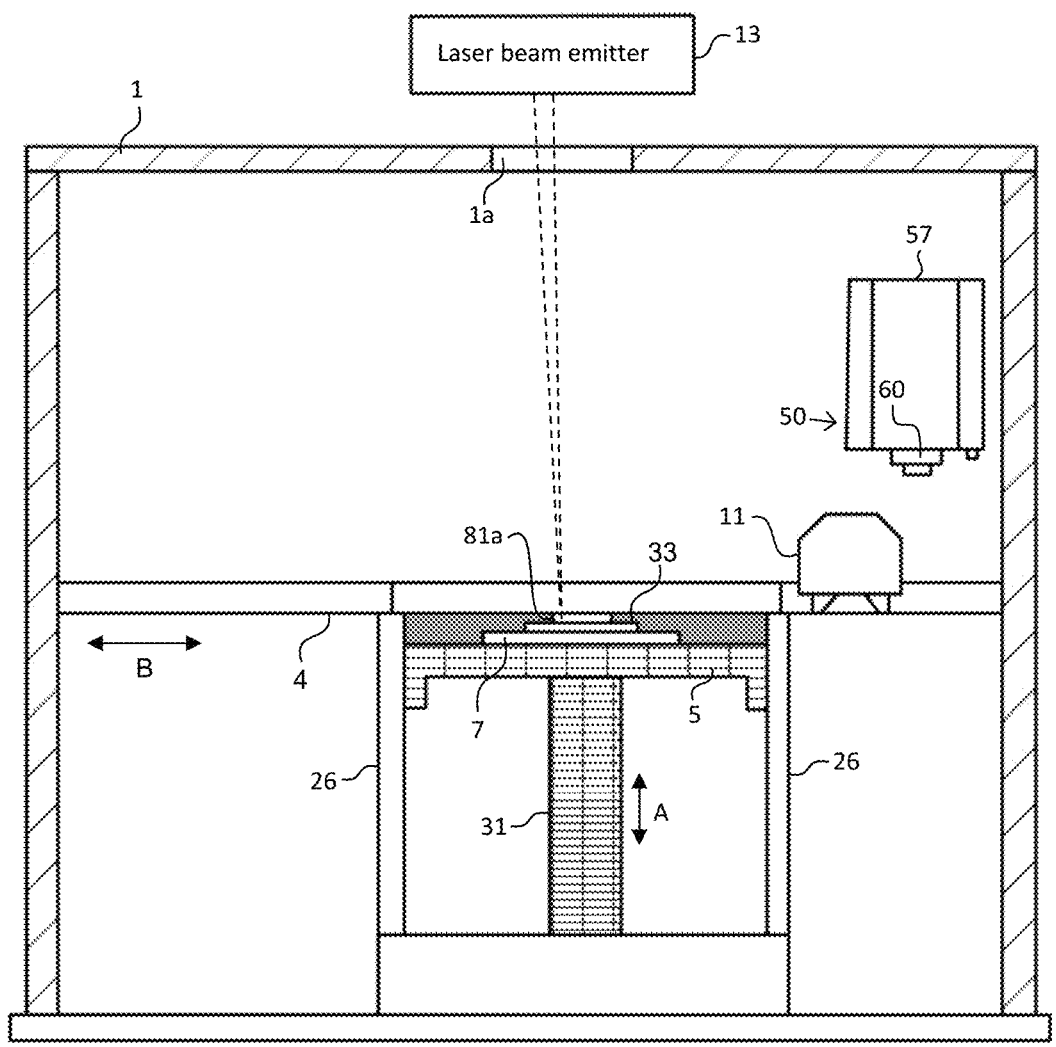
FIG. 10 is a drawing of a lamination molding method using the lamination molding apparatus according to the embodiment of the present invention.

First, as shown in FIG. 9, the height of the molding table 5 is adjusted to an appropriate position while the mounting plate 7 and the base plate 33 are placed on the molding table 5. Subsequently, as shown in FIG. 10, the recoater head 11 is moved from the left side to the right side in the direction of the arrow B, wherein the material powder is filled in the material holding section 11a of the recoater head 11. A first material powder layer 8a is thus formed on the base plate 33. A predetermined portion of the first material powder layer 8a is then irradiated with the laser beam L and sintered to form a first sintered layer 81a on the base plate 33.

Figure 11:
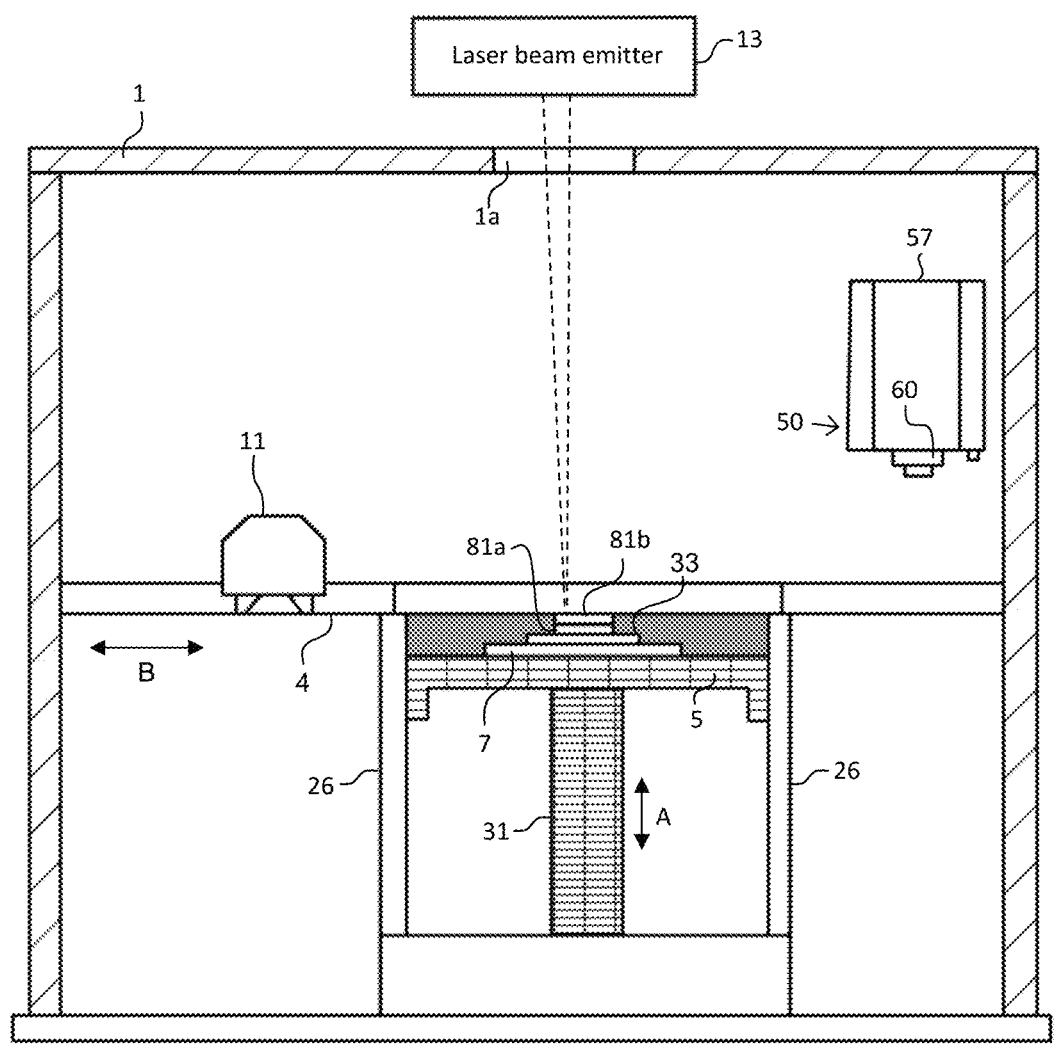
FIG. 11 is a drawing of a lamination molding method using the lamination molding apparatus according to the embodiment of the present invention.

Subsequently, as shown in FIG. 11, a height of the molding table 5 is lowered by a thickness of the material powder layer 8, and the recoater head 11 is moved from the right side to the left side of the molding region R. A second material powder layer 8b is thus formed on the first sintered layer 81a. A predetermined portion of the second material powder layer 8b is then irradiated with the laser beam L and sintered to form a second sintered layer 81b on the first sintered layer 81a.

As described above, the desired sintered body 81 is formed by repeating the formation of the material powder layer 8 and the formation of the sintered layer. The sintered layers sequentially laminated thereby are strongly fixed to each other. In this regard, cutting may be performed at edges of the sintered layers by the cutting device 50, every time a predetermined number of sintered layers are formed.

Figure 12:
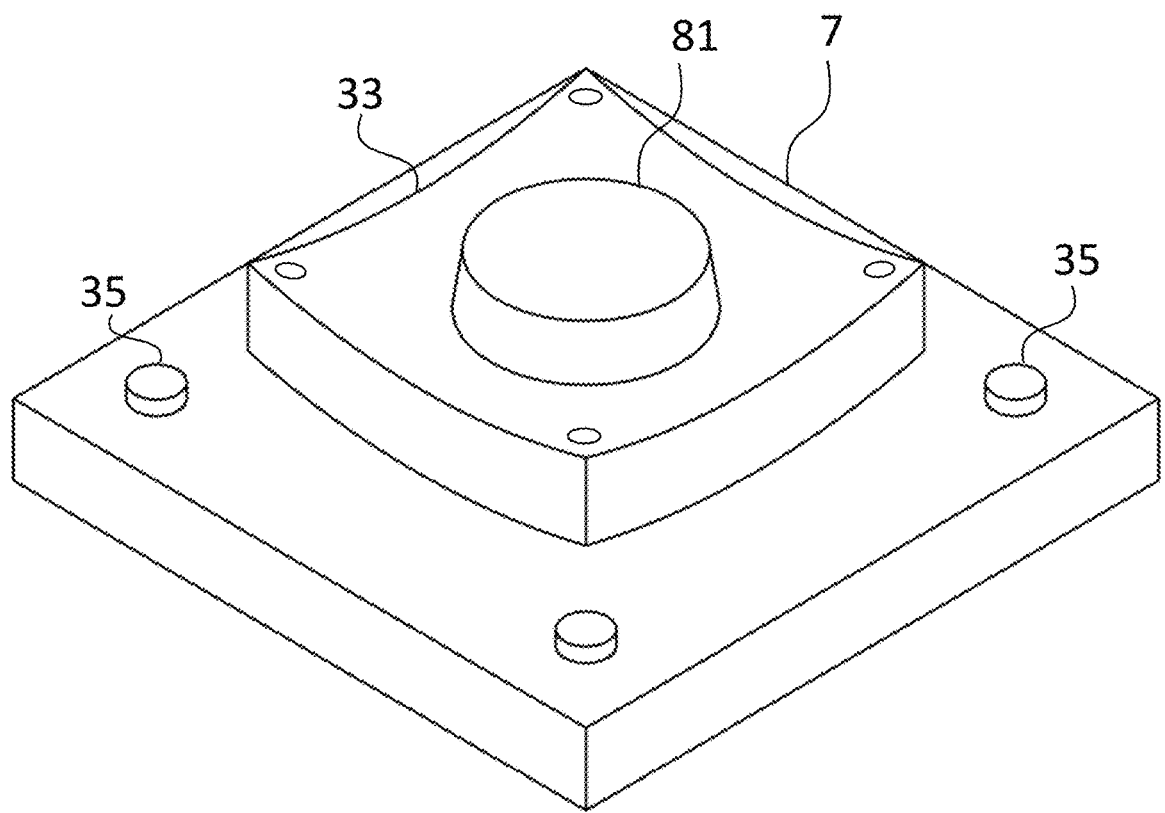
FIG. 12 is a drawing showing a state in which a sintered body is formed on the base plate.

FIG. 12 shows a state in which the sintered body 81 is formed on the base plate 33. As shown in FIG. 12, the base plate 33 is deformed such that the end edges of the base plate 33 are warped upward. In the placing step of the present embodiment, vicinities of the center of gravity P of the base plate 33 are fixed to the mounting plate 7. The material powder layer 8 expands when it is heated and melted by the irradiation with the laser beam L in forming the sintered body 81, and then the material powder layer 8 contracts when it is cooled and solidified to become the sintered layer. Consequently, as the sintered layer contracts, the base plate 33 in contact with the sintered layer is also deformed such that the ends are warped upward.

An upper surface processing step in which the upper surface 82 of the sintered body 81 generated in the molding step is planarized to form a processed surface 84 is performed. In the present embodiment, the upper surface 82 of the sintered body 81 is planarized in a horizontal direction by cutting or grinding. Generally, cutting is advantageous when machining allowance is relatively large and an area of the upper surface 82 is relatively small. On the other hand, grinding is advantageous when machining allowance is relatively small, and the area of the upper surface 82 is relatively large. In the present embodiment, the lamination molding apparatus comprises the cutting device 50, and thus the upper surface 82 of the sintered body 81 can be planarized by cutting with the cutting tool attached to the spindle 60 of the cutting device 50. When the lamination molding apparatus comprises a processing device, such as the cutting device 50, the upper surface processing step can be performed in the lamination molding apparatus. That is, preferably, the processed surface 84 is formed in the upper surface processing step by planarizing the upper surface 82 of the sintered body 81 while the base plate 33 on which the sintered body 81 is formed is fixed on the mounting plate 7 placed in the molding region R. When the lamination molding apparatus does not comprise the processing device, it is necessary to remove the mounting plate 7 from the molding table 5, and to transfer the base plate 33 on which the sintered body 81 is laminated and the mounting plate 7 to a cutting apparatus or a grinding apparatus for cutting or grinding. The present embodiment is advantageous in that the occurrence of positional errors due to the transfer is prevented and that the burden of transfer is avoided.

Figure 13:
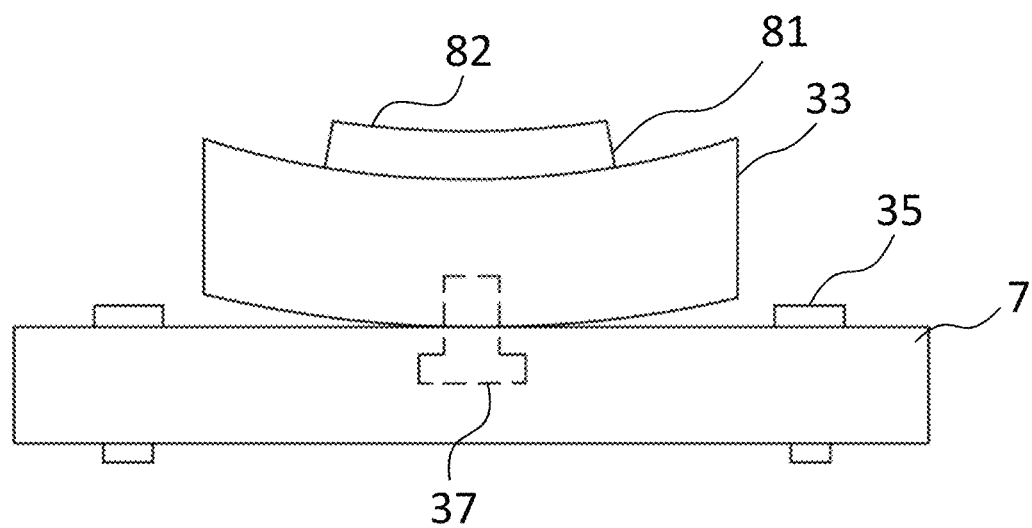
FIG. 13 is a drawing showing a state before performing an upper surface processing step according to the embodiment of the present invention.
Figure 14:
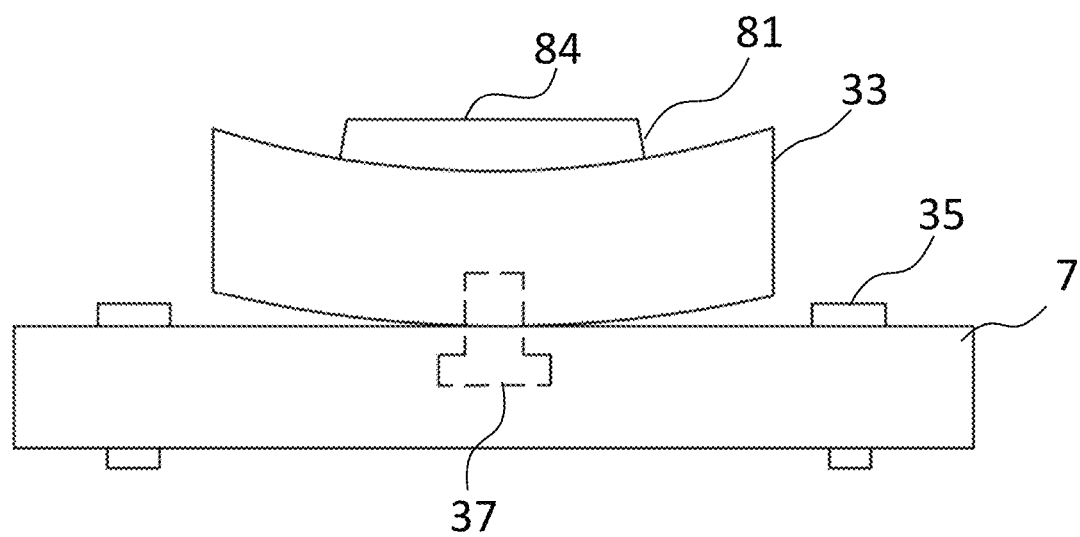
FIG. 14 is a drawing showing a state after performing the upper surface processing step according to the embodiment of the present invention.

FIG. 13 and FIG. 14 are side views of the mounting plate 7 and the base plate 33 from the right side. In an example shown in FIG. 13, the upper surface 82 of the sintered body 81 has such a shape that the end edges of the upper surface 82 are warped upward. A degree of warping of the upper surface 82 of the sintered body 81 is usually smaller than a degree of warping of the base plate 33. In the upper surface processing step of the embodiment, cutting is performed for the upper surface 82 of the sintered body 81 obtained after completing the molding step, and the processed surface 84 shown in FIG. 14 is thus formed. The processed surface 84 is planarized so as to become a horizontal plane in the present embodiment, but not limited thereto. It is preferable to perform the upper surface processing step after the deformation of the base plate 33 accompanied by the warp is terminated. This enables the formation of the processed surface 84 while the residual stress between the sintered body 81 and the base plate 33 is in a balanced state. Consequently, the base plate 33 does not deform substantially after the formation of the processed surface 84, and thus the deterioration of shape accuracy of the processed surface 84 can be prevented. A desired three-dimensional molded object E with the planarized processed surface 84 can be obtained by the upper surface processing step.

Preferably, a rear surface processing step of processing the rear surface 39 of the base plate 33 to form a processed surface 33a is performed. In a first rear surface processing step as an example of the rear surface processing step, the rear surface 39 of the base plate 33 is planarized with the processed surface 84 of the sintered body 81 as a reference plane, after the upper surface processing step. First, the base plate 33 is removed from the mounting plate 7 after the upper surface processing step. Subsequently, the three-dimensional molded object E is placed on the cutting apparatus or the grinding apparatus so that the processed surface 84 becomes the reference plane. Since the area of the rear surface 39 of the base plate 33 is relatively large, processing by grinding is desired. In the present embodiment, the three-dimensional molded object E is placed on the grinding apparatus having a processing table D, a grindstone, and a spindle for rotating the grindstone. The three-dimensional molded object E is vertically inverted so that the processed surface 84 of the sintered body 81 is positioned on the lower side, and then the sintered body 81 is fixed to the processing table D. The planarized processed surface 84 can be thus used as the reference plane for processing the rear surface 39. The rear surface 39 of the base plate 33 is then planarized to obtain the processed surface 33a. At this time, the residual stress is in the balanced state between the base plate 33 and the sintered body 81, and the substantial deformation does not occur. Consequently, the three-dimensional molded object E having good shape accuracy can be obtained. In this regard, the lamination molding apparatus comprising the cutting device 50 or the grinding device may be used as the cutting apparatus or the grinding apparatus for performing the rear surface processing step.

Figure 15:
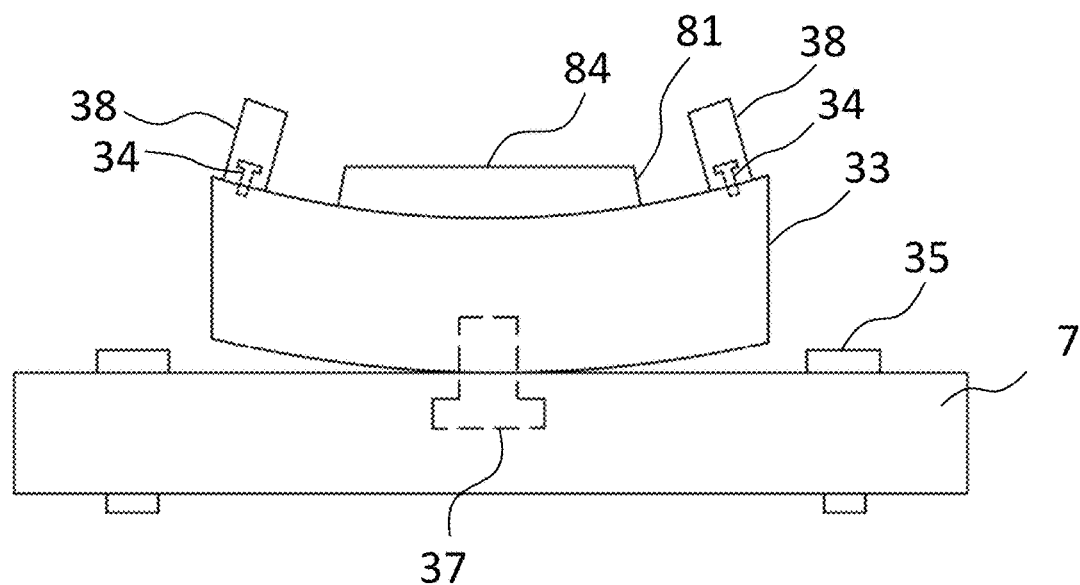
FIG. 15 is a drawing showing a state in which support columns are fixed on an upper surface of the base plate in a second rear surface processing step according to the embodiment of the present invention.
Figure 16:
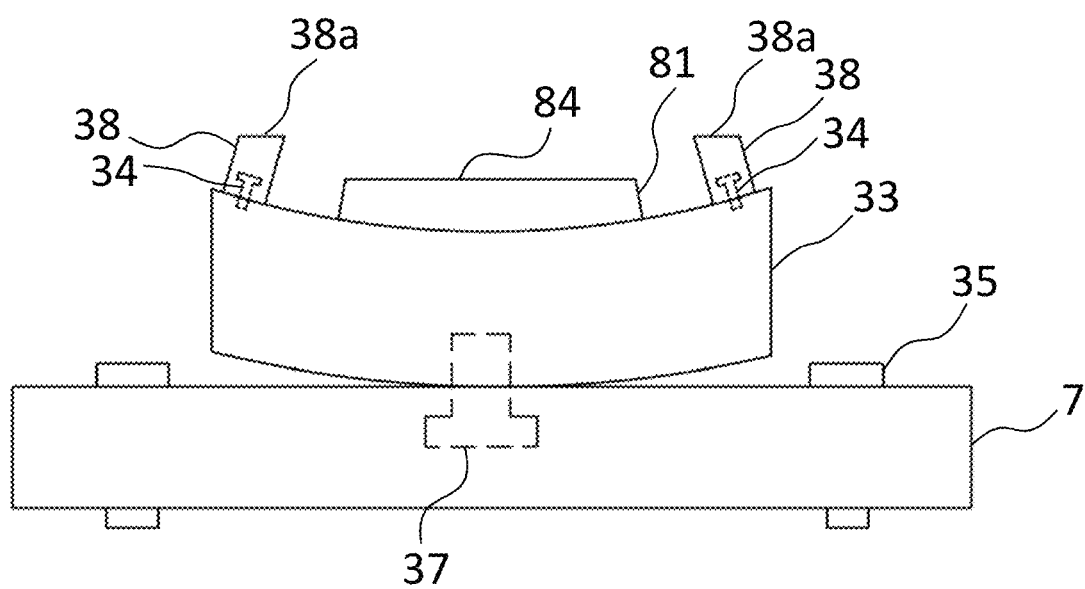
FIG. 16 is a drawing showing a state in which horizontal planes of the support columns are formed in the second rear surface processing step according to the embodiment of the present invention.

In a second rear surface processing step as another example of the rear surface processing step, a plurality of support columns 38 is fixed on the upper surface of the base plate 33 after the upper surface processing step. Upper surfaces of the plurality of support columns 38 are then respectively planarized to form the horizontal planes 38a of a same height, and the rear surface 39 of the base plate 33 is planarized with the horizontal planes 38a of the plurality of support columns 38 as a reference plane. FIG. 15 and FIG. 16 are side views of the mounting plate 7 and the base plate 33 from the right side. First, as shown in FIG. 15, the plurality of support columns 38 are mounted on the upper surface of the base plate 33. In order to mount the support columns 38 on the base plate 33, for example, fixing bolts 34 are used. When the support columns 38 are fixed by the fixing bolts 34, it is preferable to form beforehand tap holes on the base plate 33 into which the fixing bolts 34 can be screwed, as shown in FIG. 5 and FIG. 6. At this time, heads of the fixing bolts 34 are arranged to be lower than the horizontal planes 38a to be formed. In another embodiment, for example, recesses may be formed in the upper surface of the base plate 33 to embed the support columns 38 in the recesses. In further another embodiment, for example, grooves may be provided on the upper surface of the base plate 33, and the support columns 38 may be shaped to be engageable with the grooves. Any fixing method can be adopted, as long as the support columns 38 can be fixed on the upper surface of the base plate 33 with sufficient force. The horizontal planes 38a need to be formed at a position higher than the processed surface 84 of the sintered body 81. Therefore, a height of the upper surface of the support columns 38 mounted on the base plate 33 is arranged to be higher than the processed surface 84. While the support columns 38 have a prismatic shape in the present embodiment, support columns of another shape may be used as long as the horizontal planes 38a can be formed. The four support columns 38 are erected at four corners of the base plate 33 in the present embodiment, but there is no limitation regarding the number and the fixing positions of the support columns 38.

Subsequently, the upper surfaces of the support columns 38 are planarized to obtain the horizontal planes 38a respectively having the same height, as shown in FIG. 16. The support columns 38 may be processed by either cutting or grinding. In the present embodiment, grinding is performed by means of the cutting device 50 of the lamination molding apparatus. This is preferable in that it is not necessary to transfer the three-dimensional molded object E to the separate cutting apparatus or the grinding apparatus in processing the support columns 38.

Figure 17:
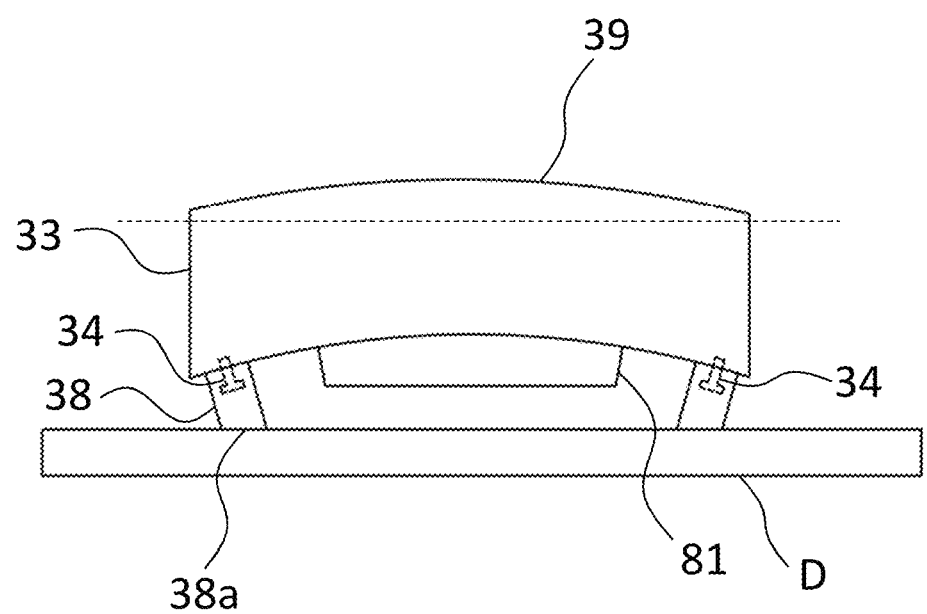
FIG. 17 is a drawing showing a state in which the sintered body and the base plate are placed on a processing table with the horizontal planes of the support columns downward in the second rear surface processing step according to the embodiment of the present invention.
Figure 18:
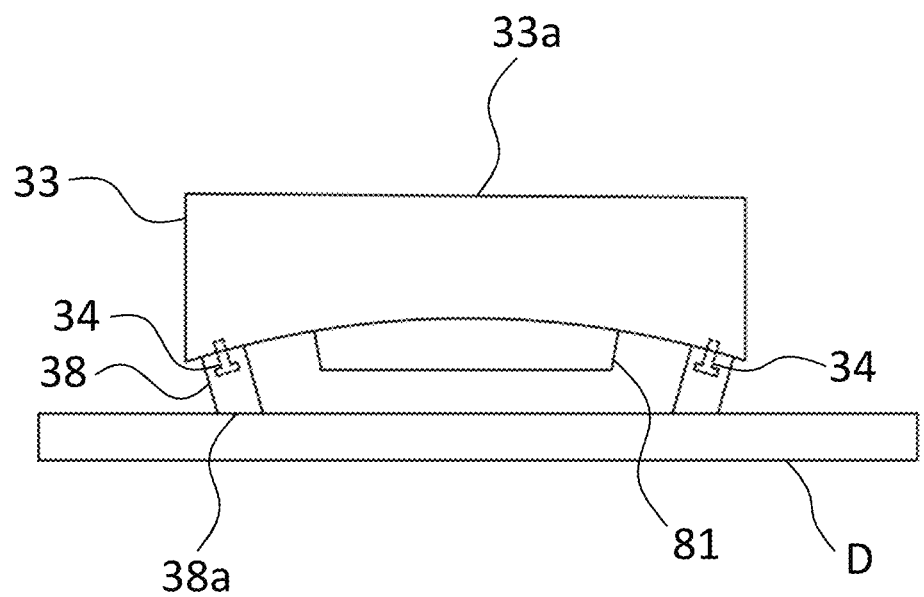
FIG. 18 is a drawing showing a state after performing the second rear surface processing step according to the embodiment of the present invention.
Figure 19:
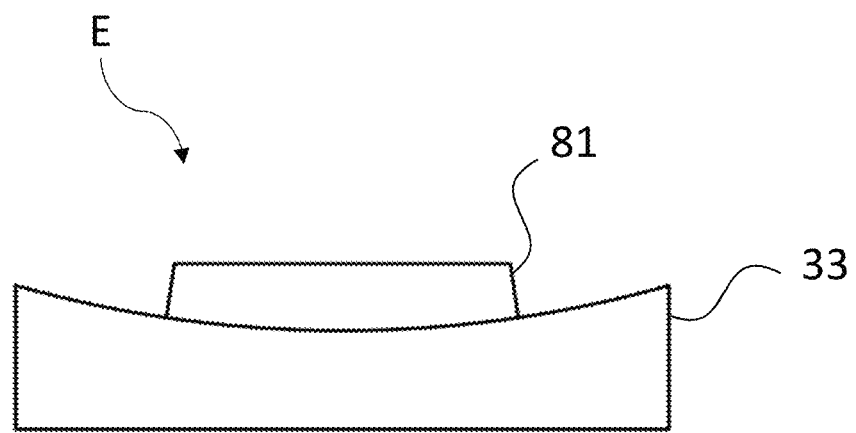
FIG. 19 is a drawing showing a three-dimensional molded object produced in the embodiment of the present invention.

After forming the horizontal planes 38a, the base plate 33 is removed from the mounting plate 7, and the three-dimensional molded object E is placed on the cutting apparatus or the grinding apparatus so that the horizontal planes 38a becomes the reference plane. The rear surface 39 may be processed by either cutting or grinding, similarly to the first rear surface processing step. The lamination molding apparatus comprising the cutting device 50 or the grinding device can be used as the cutting apparatus or the grinding apparatus for processing the rear surface 39. In the present embodiment, the three-dimensional molded object E is placed on the grinding apparatus having the processing table D, the grindstone, the spindle for rotating the grindstone. As shown in FIG. 17, the three-dimensional molded object E is vertically inverted so that the horizontal planes 38a of the support columns 38 are positioned on the lower side, and the sintered body 81 is fixed to the processing table D. The planarized horizontal planes 38a can be thus used as the reference plane for processing the rear surface 39. The rear surface 39 of the base plate 33 is then planarized to obtain the processed surface 33a, as shown in FIG. 18. Finally, the support columns 38 are removed to obtain the desired three-dimensional molded object E.

In the second rear surface processing step, the rear surface 39 of the base plate 33 is processed by means of the support columns 38. The base plate 33 can be thus planarized with the reference plane parallel to the processed surface 84 of the sintered body 81, without depending on the processed surface 84 of the sintered body 81. Consequently, the three-dimensional molded object E having better shape accuracy is obtained. Furthermore, the rear surface 39 of the base plate 33 can be planarized even when the area of the processed surface 84 of the sintered body 81 is small or hardly present. Therefore, the method for producing a three-dimensional molded object according to the present embodiment is particularly effective in obtaining the three-dimensional molded object E integrally with the base plate 33.

In the afore-mentioned manner, the three-dimensional molded object E shown in FIG. 16 is produced. This three-dimensional molded object E can be used, for example, as a mold for resin molding. In the method described above, the base plate 33 is allowed to deform when the sintered body 81 is formed. The residual stress is thus balanced between the sintered body 81 and the base plate 33, and further deformation does not substantially occur. Furthermore, the upper surface 82 of the sintered body 81 is planarized after the deformation of the base plate 33 is terminated. The residual stress is thus maintained balanced between the sintered body 81 and the base plate 33, and further deformation of the base plate 33 does not substantially occur after processing. The same applies to the case where the rear surface 39 of the base plate 33 is planarized. In this way, the shape accuracy of the three-dimensional molded object is maintained.

Other Embodiments

It is noted that the scope of application of the technical idea in the present application is not limited to the aforementioned embodiments. For example, while the approximate center of the base plate 33 is fixed to the mounting plate 7 at two points in the embodiments described above, it may be fixed at three or four points, and it may be also fixed at only one point. In the case of fixing at one point, it is preferable to devise measures (e.g., providing a rotation stopper on the side) in order to avoid the rotation of the base plate 33 relative to the mounting plate 7. In this way, the same effects as the embodiments described above can be achieved in the cases other than the case of fixing at two points.

What is claimed is:

1. A method for producing a three-dimensional molded object, comprising:
   a placing step of placing a base plate and a mounting plate within a molding region, wherein:
      a first material powder layer is formed on the base plate;
      the base plate is fixed to the mounting plate only at one or more fixing points; and
      a position of all of the one or more fixing points is determined so that $r2/r1 \leq 0.70$, with r1 being a length from a center of gravity of the base plate to an end of the base plate that is farthest from the center of gravity in plan view, r2 being a radius of a circle that surrounds the one or more fixing points and has the center of gravity as a center point;

a molding step of laminating sintered layers to form a sintered body of the three-dimensional molded object, wherein the sintered layers are laminated by repeatedly spreading material powder to form a material powder layer and irradiating the material powder layer with a beam to form a sintered layer; and an upper surface processing step of planarizing an upper surface of the sintered body to form a processed surface after the molding step is completed.

2. The method for producing a three-dimensional molded object of claim 1, wherein, in the upper surface processing step, the processed surface is formed by planarizing the upper surface of the sintered body while the base plate on which the sintered body is formed is fixed on the mounting plate within the molding region.

3. The method for producing a three-dimensional molded object of claim 1, further comprising:

a first rear surface processing step of planarizing a rear surface of the base plate with the processed surface as a reference plane, after the upper surface processing step, wherein the rear surface of the base plate is an under surface of the base plate during the molding step and an upper surface of the base plate during the first rear surface processing step.

4. The method for producing a three-dimensional molded object of claim 1, further comprising:

a second rear surface processing step of fixing a plurality of support columns on an upper surface of the base plate, planarizing upper surfaces of the plurality of support columns to form horizontal planes respectively having a same height in a state that the upper surfaces of the plurality of support columns are higher than the processed surface, and planarizing a rear surface of the base plate with the horizontal planes as a reference plane, after the upper surface processing step, wherein the rear surface of the base plate is an under surface of the base plate during the molding step and an upper surface of the base plate during the second rear surface processing step.

* * * * *